INVENTOR
M. R. AARON
BY R. B. Ardis
ATTORNEY

Jan. 1, 1957 M. R. AARON 2,776,344

DISTORTION CORRECTION IN REPEATED CARRIER TRANSMISSION SYSTEMS

Filed July 21, 1955 2 Sheets-Sheet 2

INVENTOR
M. R. AARON
BY R. B. Ardis
ATTORNEY

United States Patent Office 2,776,344

Patented Jan. 1, 1957

2,776,344

DISTORTION CORRECTION IN REPEATERED CARRIER TRANSMISSION SYSTEMS

Marvin R. Aaron, Whippany, N. J., assignor to Bell Telephone Laboratories, Incorporated, New York, N. Y., a corporation of New York Application July 21, 1955, Serial No. 523,464

12 Claims. (Cl. 179—171)

This invention relates generally to repeatered signal transmission lines operable over a wide band of carrier frequencies and more particularly, although in its broader aspects not exclusively, to repeatered signal transmission lines of the submarine cable type, in which repeater locations are not determined primarily by geographical considerations.

When the repeaters of a signal transmission system have input and output impedances differing substantially from the line impedance, part of the signal current reaching the input of each repeater is reflected back toward the output of the preceding repeater, where another reflection occurs. Thus, at the input of the repeater first mentioned, the original signal is joined by a doubly-reflected current after a delay equal to twice the time of transmission between the two repeaters and weaker by twice the attenuation of the transmission line-section and the sum of the two return losses. Since the attenuation of the line increases with frequency, the rejoining reflected current is strongest at the low end of the frequency band of the system and decreases with increasing frequency. Because of the change in phase with frequency, this current phases in and out with the original signal, resulting in ripples in the overall system attenuation characteristic. Such ripples (generally called "interaction ripples") are usually not amenable to equalization on a broad band basis and, because of their cumulative nature, tend to be particularly severe in a transoceanic submarine cable system thousands of miles long.

In the past, interaction ripples in long repeatered transmission lines have been minimized by careful design of repeater input and output impedances. This has generally involved the use of either terminated networks or hybrid networks in coupling the repeaters to the line. Both techniques, however, reduce the gain of the repeater below what it would be if non-terminated coupling networks could be used and necessitate either an increase in the total number of repeaters needed in a long signal transmission system or a decrease in the amount of negative feedback which it is possible to employ within the signal frequency band for stabilization purposes. In addition, both techniques have generally involved at least a certain amount of increased repeater cost but also in increased repeater size. The latter aspect is particularly important in a transmission line of the submarine cable type since, in order to facilitate the cable-laying process, it is desirable to have as little increase in the cable diameter at repeater points as possible.

A principal object of the present invention is to reduce the interaction ripples appearing in a repeatered signal transmission line without having to match the repeater impedances to the line impedance.

A correlative object is to increase the gain available from the repeaters of a repeatered signal transmission line without causing increased interaction ripples to appear in the overall attenuation characteristic of the system.

Another object is to improve the signal-to-noise ratio of a long repeatered signal transmission line in as simple a manner as possible.

Still another object is to permit either a decrease in the number of repeaters required or an increase in the amount of in-band feedback employed in a long repeatered signal transmission line.

In accordance with a principal feature of the invention, all of the above objects are accomplished in a long repeatered carrier-frequency signal transmission line by staggering the longitudinal repeater spacing in a carefully predetermined manner which is different in at least some different portions of the line. In each direction of transmission, the repeaters divide the line into a succession of pairs of adjacent consecutive line-sections between repeaters. In accordance with a feature of the present invention, the lengths of the two line-sections in each pair are substantially $(l_0-\delta)$ and $(l_0+\delta)$, respectively, where $l_0$ is the mean length between repeaters of all of the line-sections and $\delta$ is a quarter of a wavelength along the line at a predetermined frequency within the signal frequency band of the system for each pair of line-sections, the selected frequency being different for at least some of the different pairs of line-sections. This repeater spacing results in oppositely phased ripples in each pair of line-sections in the frequency region near the predetermined frequency, with a resulting local cancellation of the variation. On a system basis, since interaction ripples are canceled in the individual pairs of line-sections at different frequencies spaced at intervals throughout at least a part of the operating frequency band of the system, the overall ripples are all reduced to a very low level. The reduction effect is further accentuated at the high frequency end of the operating frequency spectrum by the normal increase in line attenuation with frequency.

In accordance with another important feature of the invention, the predetermined frequencies in the respective different pairs of line-sections at which $\delta$ is a quarter of a wavelength along the line are distributed at substantially uniform intervals over a range of frequencies near the lower edge of the signal frequency band. Interaction ripples are thereby reduced with a maximum of uniformity over the range in which they would otherwise be greatest and the total system ripple amplitude is reduced to only a very small fraction of that found in unmatched prior art repeatered transmission systems. In a four-wire system, in which electrically separate carrier channels are used for opposite directions of transmission, the predetermined frequencies at which $\delta$ is a quarter of a wavelength are, in accordance with this feature of the invention, distributed at substantially uniform intervals over a range of frequencies near the lower edge of each carrier band. In a two-wire system, on the other hand, in which different carrier bands are used to provide two opposite directions of transmission over a single line, those predetermined frequencies are, in accordance with this feature, distributed at substantially uniform intervals over a range of frequencies near the lower edge of the combined signal band.

The present invention is an improvement over the invention forming the basis for application Serial No. 523,465, filed the same day as the instant application by J. Gammie and G. H. Lovell.

A more complete understanding of the invention may be obtained from the following detailed description of several specific embodiments thereof and their mode of operation. In the drawings.

Figure 1:
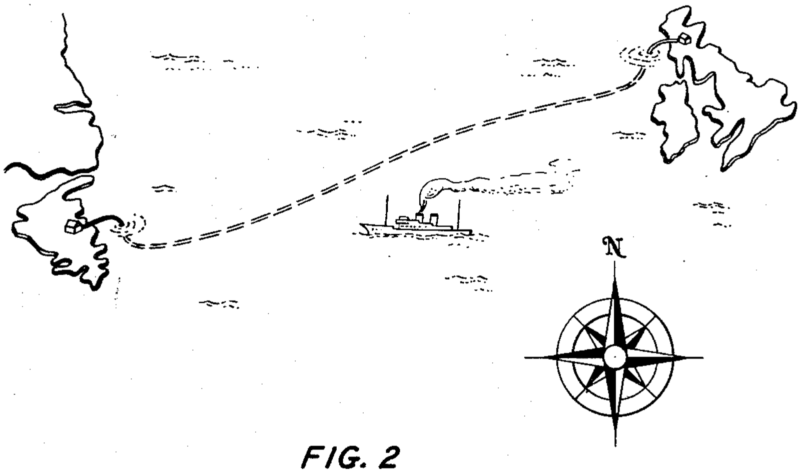
Fig. 1 illustrates the route of a transatlantic repeatered telephone cable for carrier frequency operations which may, with particular advantage, be made to embody various features of the present invention.
Figure 5:
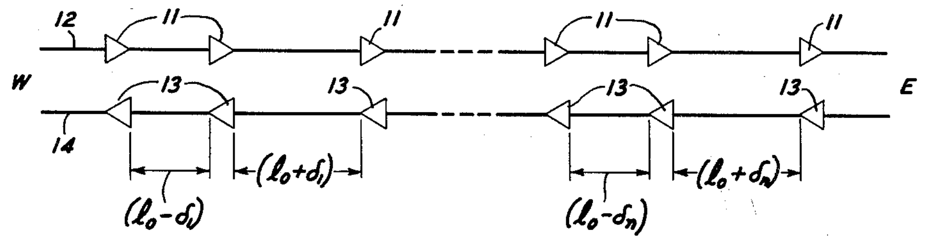
Figure 6:
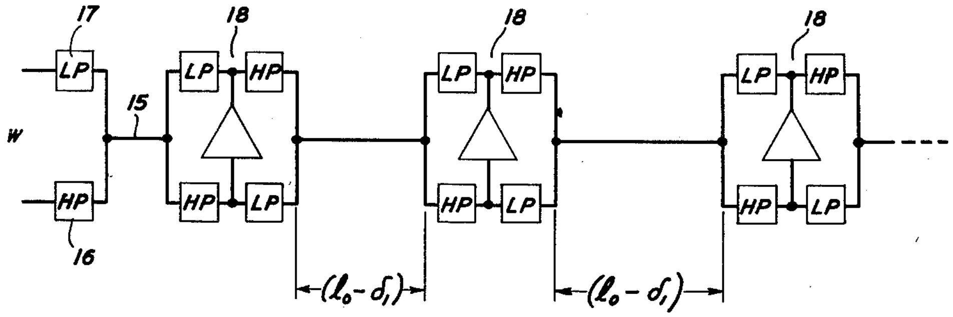

Fig. 5 shows a repeatered four-wire signal transmission line arrangement suitable for use in Fig. 1 in which the repeater spacing is staggered in accordance with the teachings of the present invention; and Fig. 6 shows one end of a repeatered two-wire signal transmission line arrangement suitable for use in Fig. 1 in which the repeater spacing is also staggered in accordance with the teachings of the invention.

As has already been suggested in the foregoing brief introductory description of the invention, interaction ripples tend to be of particular importance in transoceanic submarine cable signal transmission systems. Because of their cumulative nature, such ripples are likely to be more severe in such systems unless special precautions are taken than they would be in shorter land line communication systems. Fig. 1 of the drawings is a rough diagrammatic illustration of one such transoceanic cable—a transatlantic carrier telephone submarine cable system extending for approximately 2000 nautical miles on the ocean floor between Newfoundland and Scotland. Fifty-two repeaters are spaced at intervals throughout the length of the system to overcome line losses.

Figure 2:
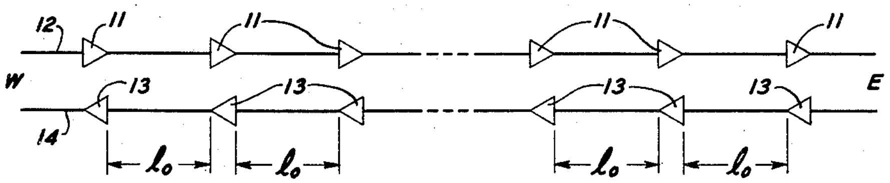
Fig. 2 shows a repeatered four-wire signal transmission line ararngement suitable for use in Fig. 1 in which the repeater spacing is in accordance with the teachings of the prior art.

If designed in accordance with the principles known in the prior art, the transatlantic cable shown diagrammatically in Fig. 1 may take the form of the repeatered "four-wire" transmission line illustrated in Fig. 2. The system in Fig. 2 has electrically separate channels for transmission from west to east and from east to west, each of which may, for example, have its own physically separate repeaters and be in a physically separate cable. A plurality of one-way repeaters 11 are spaced at equal intervals along the line 12, providing a plurality of west-east carrier communication channels, and a similar number of oppositely directed repeaters 13 are spaced at equal intervals along the line 14, providing the east-west carrier channels. For both directions of transmission, the repeaters in Fig. 2 are separated by a distance $l_0$ measured lengthwise along the transmission line.

Figures 3, 4:
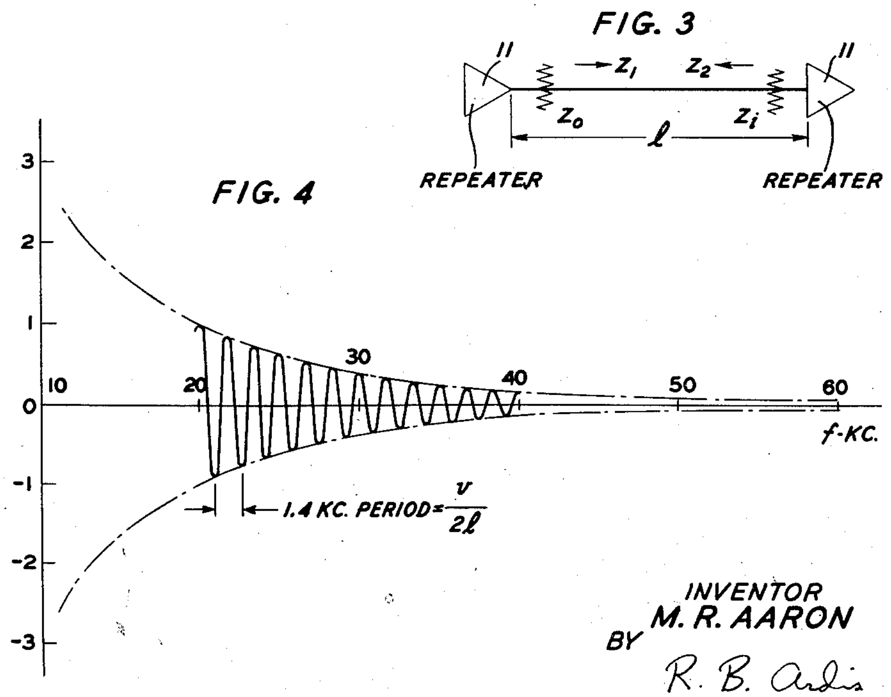
Fig. 3 is a sketch of a single line-section existing between a pair of successive repeaters and is used to assist in formulating a number of equations.
Fig. 4 illustrates the interaction ripples occurring in prior art repeatered signal transmission systems with impedance mismatches between repeaters and the line.

The effect of interaction ripples in a system like that shown in Fig. 2 may best be shown with the aid of the sketch of a single line-section between repeaters given in Fig. 3. In Fig. 3, there is shown a single line-section between a pair of adjacent consecutive west-east repeaters 11. The distance in nautical miles along the line 12 from the output of the first repeater to the input of the section is $l$, $Z_0$ is the output impedance of the first repeater, $Z_i$ is the input impedance of the second repeater, $Z_1$ is the impedance of the line as seen from the first repeater, and $Z_2$ is the impedance of the line as seen from the second repeater.

The interaction factor (IAF) for the section of line shown in Fig. 3 is given by $$IAF=1-r_1r_2e^{-2\gamma l} \quad (1)$$

where $r_1$ and $r_2$ are the reflection coefficients at the first and second repeaters, respectively, and $\gamma$ is the propagation constant of the line per nautical mile. The propagation constant $\gamma$ can be separated into its real and imaginary components $$\gamma=\alpha+j\beta \quad (2)$$

and, since the reflection coefficients $r_1$ and $r_2$ are, by definition, $$r_1=\frac{Z_1-Z_0}{Z_1+Z_0} \quad (3)$$

and $$r_2=\frac{Z_2-Z_i}{Z_2+Z_i} \quad (4)$$

the interaction factor in db is given by $$|IAF|=20\log_{10}\left|1-\left(\frac{Z_1-Z_0}{Z_1+Z_0}\right)\left(\frac{Z_2-Z_i}{Z_2+Z_i}\right)e^{-2(\alpha+j\beta)l}\right| \quad (5)$$

An upper bound on the magnitude of the interaction factor can be found by noting that $$|1-z|\leq 1+|z| \quad (6)$$

where $z$ is a complex quantity equal to $r_1r_2e^{-2\gamma l}$. When this fact is used in Equation 5 along with the assumption of $$|z|<<1 \quad (7)$$

the magnitude of the interaction factor in db is found to be represented by the relation $$|\mathrm{IAF}|\leq|8.686\ |r_1|\ |r_2|e^{-2\alpha l} \quad (8)$$

An expression can readily be obtained which illustrates the sinuosity exhibited by Expression 5. If the product of the two reflection coefficients is represented by a complex number $A+jB$, it can be shown that $$|\mathrm{IAF}|=10\log_{10}[1-2e^{-2\alpha l}(A\cos 2\beta l+B\sin 2\beta l)+e^{-4\alpha l}(A^2+B^2)] \quad (9)$$

which can be approximated for all practical situations by $$|\mathrm{IAF}|=|8.686e^{-2\alpha l}(A\cos 2\beta l+B\sin 2\beta l \quad (10)$$

or $$|IAF|\doteq 8.686\sqrt{A^2+B^2}e^{-2\alpha l}\left[\cos\left(2\beta l-\tan^{-1}\frac{B}{A}\right)\right] \quad (11)$$

Since $$\beta=\frac{2\pi f}{v} \quad (12)$$

the ripple frequency is given by $$f_r=\frac{v}{2l} \quad (13)$$

where v is the velocity of wave propagation over the transmission line medium.

If the velocity of propagation $v$ were constant with frequency and the ratio $$\frac{B}{A}$$

independent of frequency, Equation 11 would represent simply an amplitude modulated wave. Furthermore, if $(A^2+B^2)$ were independent of frequency, the envelope would be simply exponential. Deviations from these ideals are small, however, in most repeatered carrier signal transmission systems and do not materially affect the analysis other than by introducing a small non-uniformity in the ripple frequency. The ripples, in other words, are angle-modulated as well as amplitude-modulated, but with the angle component so small as to be relatively insignificant.

When each transmission line-section in a long repeatered system of the prior art type shown in Fig. 2 exhibits the same electrical performance in its respective working environment, the overall interaction ripples for the system may be obtained merely by multiplying Equation 10 or 11 by the number of line-sections in the system. In order to illustrate such an overall system ripple, Equation 10 has been plotted in Fig. 4 for the transatlantic cable system illustrated in Fig. 1, assuming mismatches between repeaters and line and using the prior art repeater arrangement shown in Fig. 2. The length $l_0$ of each line-section between repeaters is approximately 36.9 nautical miles, there are fifty-two line-sections in all, and the line impedance and attenuation in each section are those found in a standard 0.620 inch submarine telephone cable. The velocity of propagation over the cable medium is substantially constant at $10^5$ nautical miles per second for the operating frequency range from 20 to 164 kilocycles. The magnitudes of the reflection coefficients at the repeater terminals are assumed, by way of example, to be of the order of 50 percent for this frequency range.

In Fig. 4 the plot of Equation 10 has been normalized to unity at 20 kilocycles in order to facilitate comparison, and all ordinates should be multiplied by 0.8 to obtain actual system ripple magnitudes in db. As shown, the peak ripple amplitude in the neighborhood of 20 kilocycles, the lower edge of the operating frequency band, is about ±0.8 db, with a nominal frequency of 1.4 kilocycles. Since all cable lengths and their associated attenuations are assumed equal in this analysis, Fig. 4 represents the maximum effect which may be expected due to interaction ripples for the submarine cable system of Fig. 1.

As has already been indicated, past practice has been to minimize interaction ripples in a long repeatered signal transmission system like that shown in Fig. 1 by carefully matching the repeater input and output impedances to the impedance of the line, either through the use of terminating impedances for the repeater coupling networks or through the use of hybrid coupling networks. Both techniques, however, reduce the gain available from each repeater and necessitate either an increase in the number of repeaters used in the system or a decrease in the amount of in-band feedback that may be employed for stabilization purposes. Since such ripples are cumulative over a long system, the problem assumes particular importance when a transmission system having the overall length of the transatlantic submarine cable system shown in Fig. 1 is contemplated.

In the above-identified copending application of J. Gammie and G. H. Lovell, an arrangement is disclosed for reducing the interaction ripple amplitude in a long carrier-frequency signal transmission system like the transatlantic cable system shown in Fig. 1 without detracting from repeater gain for impedance matching purposes. The repeater spacing is staggered by fixing the length of each line-section between repeaters relative to the next adjacent consecutive line-section so that the lengths of the two sections are $(l_0-\delta)$ and $(l_0+\delta)$, respectively, where $l_0$ is the mean length between repeaters of all of the line-sections and $\delta$ is a quarter of a wavelength along the line at a frequency at or near the bottom of the operating signal band. The interaction ripples in successive line-sections are thereby made to cancel each other at the selected frequency and are reduced in magnitude throughout the operating signal band of the system.

The present invention makes possible a reduction in ripple amplitude in a long repeatered transmission line to a point well below even that of the arrangement disclosed in the Gammie-Lovell application. In accordance with a principal feature of the present invention, the repeater spacing in a long repeatered signal transmission system like that shown in Fig. 1 is not only staggered from one line-section to the next, but the staggering is itself varied in a carefully predetermined manner for at least some of the line-sections in the system. The length of each line-section between repeaters is so fixed relative to the next adjacent consecutive line-section that the lengths of the two sections are $(l_0-\delta)$ and $(l_0+\delta)$, respectively, where as in the Gammie-Lovell arrangement, $l_0$ is the mean length between repeaters of all of the line-sections and $\delta$ is a quarter of a wavelength along the line at one frequency $f_c$ in the lower portion of the operating signal band of the system. In accordance with a principal feature of the present invention, however, the frequency $f_c$ is different for at least some of the successive pairs of line-sections in the system. In a manner which will be explained, the interaction ripples in each pair of consecutive line-sections are thereby made to cancel each other at the selected frequency $f_c$ and are much reduced in magnitude at other frequencies. Over the entire system there is, of course, no complete ripple cancellation at any one frequency, since the cancellation frequencies $f_c$ differ from one pair of line-sections to another, but the cumulative result is a ripple greatly reduced in magnitude even below that obtained when the repeater spacing arrangement disclosed in the above-identified Gammie-Lovell application is employed.

Fig. 5 of the drawings is representative of a "four-wire" repeatered transmission line embodiment of the invention suitable for use in the transatlantic submarine cable system shown in Fig. 1. The arrangement of Fig. 5 is much the same as the prior art arrangement of Fig. 2 except for the important aspect of repeater spacing. As illustrated, the first two line-sections at one end of the embodiment of the invention given in Fig. 5 have lengths of $(l_0-\delta_1)$ and $(l_0+\delta_1)$, respectively. In the line-sections of at least some of the remaining pairs, the values of $\delta$ differ from $\delta_1$. In at least one preferred embodiment of the invention, $\delta$ varies from $\delta_1$ for the first pair of line-sections, $\delta_2$ for the second, $\delta_3$ for the third, and so on throughout the length of the system to $\delta_n$ for the final pair of line-sections. As pointed out above, $\delta$ is a quarter of a wavelength along the line at a frequency $f_c$ in the lower portion of the operating signal band and is given by $$\delta=\frac{v}{8f_c} \qquad (14)$$

where $f_c$ is the selected frequency of ripple cancellation for the respective pairs of line-sections.

If, as shown by Equation 11, the magnitude of the interaction factor for a single line-section is approximated by $$|IAF|=Ke^{-2\alpha l}\cos(2\beta l+\varphi) \qquad (15)$$

where $\varphi$ and K are independent of length, then the interaction factor for two adjacent line-sections of length $(l_0-\delta)$ and $(l_0+\delta)$, respectively, is given by $$|IAF|=|IAF|_1+|IAF|_2=K(e^{-2\alpha(l_0-\delta)}\cos[2\beta(l_0-\delta)+\varphi]+e^{-2\alpha(l_0+\delta)}\cos[2\beta(l_0+\delta)+\varphi]) \qquad (16)$$

For $\delta<<l_0$ in the exponential factor, Equation 16 can be approximated by $$IAF|=|IAF|_1+|IAF|_2\doteq 2Ke^{-2\alpha l_0}\cos 2\beta\delta\cos(2\beta l_0+\varphi) \qquad (17)$$

which shows that for each pair of successive line-sections the exponentially damped sinusoid is amplitude-modulated by $(\cos 2\beta\delta)$. It is readily seen that Equation 17 is zero whenever $2\beta\delta$ is an odd multiple of $$\frac{\pi}{2}$$

When $2\beta\delta$ is zero or an even multiple of $$\frac{\pi}{2}$$

the interaction factor for the two sections of a pair is the same as that obtained by doubling the interaction factor for one of them. The relationship between $\delta$ and $f_c$, the frequency of cancellation for a particular pair of successive line-sections, is given by $$\delta=\frac{v}{8f_c} \qquad (14)$$

and the frequency of the modulation wave within a single pair of line-sections by $4f_c$ In accordance with a principal feature of the present invention, the lengths of adjacent line-sections in a repeatered signal transmission system are fixed, not to give cancellation of interaction ripple effects within the respective pairs of consecutive line-sections at the same frequency throughout the length of the system, but to give cancellation within the respective pairs at frequencies distributed over an entire range of frequencies in the lower portions of the operating signal band of the system. In at least one embodiment of the invention, these lengths in a system having an operating frequency band from 20 to 164 kilocycles are fixed to give cancellation of ripples within the respective pairs of line-sections at frequencies distributed substantially uniformly from 20 to 30 kilocycles. On an overall system basis, there is no complete ripple cancellation at any one frequency since cancellation occurs only within each pair of adjacent consecutive line-sections having corresponding values of $\delta$. There is, however, a major reduction in both total and average interaction ripple amplitude, even beyond that afforded by the arrangement disclosed in the above-identified Gammie-Lovell application.

An example of the resulting system interaction ripple for the embodiment of the invention illustrated in Fig. 5 may be calculated by assuming that each direction of transmission includes 52 line-sections divided into 26 consecutive pairs. Each pair is then treated as in the above approximate analysis so that the interaction ripple cancels at frequency $f_c$ selected for that pair. If, in accordance with a feature of the invention, the cancellation frequencies $f_c$ are distributed uniformly between 20 and 30 kilocycles, the 26 values for $\delta$ are given by $$\delta_n = \frac{v}{8 \times 20 \times 10^3 \left[1 + \frac{(n-1)}{50}\right]} \quad (18)$$

where $n$ equals 1, 2, . . . 26. The resulting system interaction ripple is given by $$|IAF| = \sum_{n=1}^{26} K e^{-2\alpha l_0} \cos 2\beta\delta_n [\cos(2\beta l_0 + \varphi)] \quad (19)$$

This expression has been evaluated at a number of frequencies and the results tabulated below in Table I for comparison with an example where, as in the Gammie-Lovell application, all pairs are fixed to give cancellation at the same frequency of 20 kilocycles and with an example of the prior art arrangement of uniform line-section lengths through the system:

TABLE I

*Multiplying factor of single section interaction ripples*

| Frequency in kilocycles | Line-section lengths distributed to give cancellation at 26 uniformly distributed frequencies from 20 to 30 kilocycles $\left\|2\sum_{n=1}^{26}\cos 2\beta\delta\right\|$ | Line-section lengths fixed to give cancellation of ripples at 20 kilocycles $\|52\cos(2\beta\times 0.625)\|$ | Systematic addition (no shift in line-section lengths) |
|---|---|---|---|
| 20 | 13 | 0 | 52 |
| 22 | 8.6 | 8.2 | 52 |
| 24 | 2.0 | 16.2 | 52 |
| 26 | 4.4 | 23.6 | 52 |
| 28 | 10.8 | 30.6 | 52 |
| 30 | 16.8 | 36.8 | 52 |

As shown in Table I, the distribution of repeater spacings provided by the present invention is substantially superior in reducing interaction ripples over the low-loss portions of the operating frequency band even to the use of a single fixed value of $\delta$. All of the systems described in Table I are assumed, for the sake of comparison, to 52 line-sections long. The one embodying various features of the present invention and represented in the first multiplying factor column has a mean section length $l_0$ of 36.9 nautical miles and values of $\delta$ for adjacent line-section pairs differing by about 0.01 nautical mile from 0.625 nautical mile to 0.417 nautical mile. The arrangement represented in the second column is that disclosed in the above-identified Gammie-Lovell application and has a mean line-section length $l_0$ of 36.9 nautical miles and a single constant value of $\delta$ equal to 0.625 nautical mile. The last arrangement represents the prior art and has a uniform value of line-section length $l_0$ equal to 36.9 nautical miles throughout the system.

The improvement made possible by the present invention extends throughout the operating frequency band. As a result, employment of the present invention in a transoceanic submarine cable system like that shown in Fig. 1 substantially eliminates the undesirable effects of interaction ripples without requiring close impedance matches between repeater and line impedances. The maximum available gain from the repeaters is thereby retained. This gain, as previously indicated, may be put to advantage either by decreasing the number of repeaters used in the system as a whole or by increasing the amount of stabilizing in-band negative feedback used in each repeater.

The present invention is, of course, not restricted to application to "four-wire" transmissions. Another arrangement which, in accordance with the present invention, may be used to advantage in a transoceanic submarine cable system like that shown in Fig. 1 is illustrated in Fig. 6. Fig. 6 shows one end of a repeatered "two-wire" transmission line in which different carrier frequency bands are used to provide the two opposite directions of transmission over a single line 15. By way of example, the band from 20 to 92 kilocycles may be used for transmission from west to east and the band from 92 to 164 kilocycles may be used for transmission from east to west. High and low pass filters 16 and 17 are used at the end of the system to separate the two directions of transmission and bilateral repeaters 18 are spaced at intervals along the line 15 fixed in accordance with the principles of the invention.

In accordance with the invention, the repeater spacing in the "two-wire" system shown in Fig. 6 is the same as that in the "four-wire" system illustrated in Fig. 5. The mean length throughout the system of the line-sections between successive repeaters is $l_0$ and the actual repeater spacing is staggered to make the lengths of successive line-sections in each pair of line-sections $(l_0-\delta)$ and $(l_0+\delta)$, respectively. As explained above, $\delta$ is a quarter of a wavelength along the line at one frequency in the lower portion of the operating signal band of the system and is different for at least some of the successive pairs of line-sections. In the arrangement shown in Fig. 6, the ripple cancellation frequencies $f_c$ for each pair are near the bottom of the lower of the two frequency bands since it is at the lower frequencies that line attenuation is least and ripple magnitude is greatest.

While the invention has been described with particular reference to transoceanic carrier frequency submarine telephone cables of the two and four-wire types, it is to be understood that the disclosed arrangements are illustrative of the application of the principles of the invention. Numerous other arrangements may be devised by those skilled in the art without departing from the spirit and scope of the invention.

What is claimed is:

1. A carrier signal transmission system which comprises a line adapted to transmit a wide band of frequencies and a plurality of separate wave translating networks connected in tandem in said line and spaced at substantially regular intervals therealong to divide the said line into a succession of pairs of adjacent line-sections between networks, the length of one line-section in each pair being substantially $(l_0-\delta)$ and the length of the other line-section therein being substantially $(l_0+\delta)$, where $l_0$ is the mean length between the said networks of all of said line-sections and $\delta$ for each of said pairs is substantially a quarter of a wavelength at one frequency in said band and is different for at least some of said pairs whereby interaction ripples in the transmission characteristic of said line-sections add out of phase in each of said pairs and substantially cancel in each pair at the selected frequencies.

2. A carrier signal transmission system in accordance with claim 1 in which $\delta$ is different for each of said pairs of line-sections.

3. A carrier signal transmission system in accordance with claim 1 in which for each of said pairs the frequency at which $\delta$ is substantially a quarter of a wavelength is in a portion of said frequency band nearer the lower edge thereof than the upper edge thereof.

4. A carrier signal transmission system in accordance with claim 1 in which $\delta$ is different for each of said pairs of line-sections and for each of said pairs the frequency at which $\delta$ is substantially a quarter of a wavelength is in a portion of said frequency band nearer the lower edge thereof than the upper edge thereof.

5. A carrier signal transmission system in accordance with claim 1 in which $\delta$ is different for each of said pairs of line-sections and for the respective line-sections the frequencies at which $\delta$ is substantially a quarter of a wavelength are distributed at substantially uniform intervals over a range of frequencies in a portion of said frequency band nearer the lower edge thereof than the upper edge thereof.

6. A carrier signal transmission system in accordance with claim 1 in which $\delta$ is different for each of said pairs of line-sections and for the respective line-sections the frequencies at which $\delta_n$ is substantially a quarter of a wavelength are distributed at substantially uniform intervals over a range of frequencies extending from the lower edge of said frequency band to the highest frequency therein at which the interaction ripples are substantial.

7. A carrier signal transmission system which comprises a line adapted to transmit a wide band of frequencies and a plurality of repeaters having input and output impedances not necessarily matching the impedance of said line connected in tandem in said line and spaced at substantially regular intervals therealong to divide said line into a succession of pairs of adjacent line-sections between repeaters, the length of one line-section in each pair being substantially $(l_0-\delta)$ and the length of the other line-section therein being substantially $(l_0+\delta)$, where $l_0$ is the mean length between repeaters of all said line-sections, $\delta$ for each of said pairs is substantially equal to $$\frac{v}{8f_c}$$

$v$ is the velocity of propagation over said line, and $f_c$ for each of said pairs is a frequency in said band and is different for at least some of said pairs, whereby interaction ripples in the transmission characteristic of said line-sections caused by reflections at the repeater line mismatches add out of phase in each of said pairs and substantially cancel at the selected frequencies $f_c$.

8. A carrier signal transmission system in accordance with claim 7 in which $f_c$ is different for each of said pairs of line-sections.

9. A carrier signal transmission system in accordance with claim 7 in which for each of said pairs the selected frequency $f_c$ is in a portion of said frequency band nearer the lower edge thereof than the upper edge thereof.

10. A carrier signal transmission system in accordance with claim 7 in which $f_c$ is different for each of said pairs of line-sections and for each of said pairs $f_c$ is in a portion of said frequency band nearer the lower edge thereof than the upper edge thereof.

11. A carrier signal transmission system in accordance with claim 7 in which $f_c$ is different for each of said pairs of line-sections and for the respective line-sections the frequencies $f_c$ are distributed at substantially uniform intervals over a range of frequencies in a portion of said frequency band nearer the lower edge thereof than the upper edge thereof.

12. A carrier signal transmission system in accordance with claim 7 in which $f_c$ is different for each of said pairs of line-sections and for the respective line-sections the frequencies $f_c$ are distributed at substantially uniform intervals over a range of frequencies extending from the lower edge of said frequency band to the highest frequency therein at which the interaction ripples are substantial.

No references cited.